US005713452A

United States Patent [19]
Halsted

[11] Patent Number: 5,713,452
[45] Date of Patent: Feb. 3, 1998

[54] AUTOMATED TRANSPORT SYSTEM

[75] Inventor: Eric Halsted, Beauport, Canada

[73] Assignee: Steris Corporation, Mentor, Ohio

[21] Appl. No.: 637,543

[22] Filed: Apr. 25, 1996

[51] Int. Cl.$^6$ .................................................. B65G 47/46
[52] U.S. Cl. ...................... 198/370.07; 198/468.1
[58] Field of Search .................. 198/370.07, 468.1, 198/464.2; 414/529, 536

[56] References Cited

U.S. PATENT DOCUMENTS

| | | | |
|---|---|---|---|
| 3,442,948 | 5/1969 | Burt | 198/370.07 |
| 4,146,126 | 3/1979 | Mattos . | |
| 4,194,614 | 3/1980 | Hrivnak | 198/468.1 |
| 4,277,217 | 7/1981 | Miller et al. | 198/468.1 |
| 4,326,624 | 4/1982 | Ewertowski et al. | 198/370.07 |
| 4,512,562 | 4/1985 | Moll . | |
| 4,881,633 | 11/1989 | Cailey et al. . | |
| 4,925,009 | 5/1990 | Hill . | |
| 5,058,727 | 10/1991 | Jahns et al. . | |
| 5,096,045 | 3/1992 | Feddl . | |
| 5,131,531 | 7/1992 | Chambers . | |
| 5,150,781 | 9/1992 | Deisenroth et al. . | |
| 5,205,400 | 4/1993 | Breuss et al. . | |
| 5,351,809 | 10/1994 | Gilmore et al. . | |
| 5,617,944 | 4/1997 | McTaggart | 198/468.1 |

Primary Examiner—Thomas J. Brahan
Attorney, Agent, or Firm—Fay, Sharpe, Beall, Fagan, Minnich & McKee

[57] ABSTRACT

The present invention relates to a modular automated transport system for transporting articles from one location to another. The system is particularly suited for transporting baskets of medical instruments and devices as part of a washing or sterilization process. Each module has mechanisms for positioning and moving articles along the module, and for transferring articles to and from adjacent modules, load tables, washers, or like devices. Each module also has simple control and communication mechanisms that permit adding and removing modules from the system without the need for complex reprogramming of the controller.

9 Claims, 12 Drawing Sheets

AUTOMATED TRANSPORT SYSTEM

FIELD OF THE INVENTION

This invention relates generally to a modular, automated system for transporting articles from one location to another. More particularly, this invention relates to an automated transport system particularly suited for transporting baskets of medical instruments and devices as part of a washing or sterilization process.

BACKGROUND OF THE INVENTION

This invention relates to a modular automated transport system for transporting articles from one location to another. Articles may be transferred between modules, and between a module and a load or unload surface, such as a table or other equipment. The present invention is particularly suited for transporting medical instruments and other medical devices as part of a washing or sterilization process.

There has been a long need for the development of efficient and effective washing and sterilization processes for medical instruments and devices in such places as hospitals and other healthcare facilities. Specialized washers and sterilizers exist in the art, but the transportation of articles to and from washing or sterilization equipment remains a problem. Special racks, working tables, transfer carts, and the like have been developed for moving loads from one point to the next. These devices, however, are inefficient at care facilities where large numbers of articles must be handled.

Non-automatic conveyor systems already are available in the art. Such systems permit users to push loads in specialized baskets along the system without lifting, but still require the user to place the loads inside a washer or sterilizer. This substantial amount of human handling presents several difficulties. First, there is an increased risk of contamination, both of contamination of the user by a soiled load, and of contamination of a clean or sterile load by accidental mishandling of the articles. Second, the requirement that the user place soiled loads into a washer or sterilizer, and remove them when washing or sterilization is complete, can be prohibitive. A fully loaded basket can weigh over 200 pounds. Thus, there is a risk of injury to the user, and of damaging breakable and often expensive medical articles, from handling such heavy loads.

There are also motorized conveyor or transport systems in the art, but such systems are inadequate for the healthcare setting. Most such systems are non-modular or unique conveyor systems. In other words, the conveyor components and frame must be redesigned for every customer to accommodate the various numbers, positions, and types of equipment. Likewise, control systems and software must be uniquely designed. These features increase engineering and maintenance costs. Furthermore, these systems are inflexible—they cannot be altered without substantial redesign costs and effort.

Some of these difficulties can be reduced by providing a modular transport system. A modular system is composed of smaller components or modules linked together into a composite transport system. Modular systems reduce costs and permit more flexibility since modules may be arranged in numerous configurations, and can be altered far more easily than non-modular systems. Although some modular conveyor or transport systems exist in the art, current systems still are inadequate for the healthcare setting. The modules for existing systems are not designed to transport medical articles as part of a washing or sterilization process. Current modular systems lack adequate mechanical pulling and pushing systems to move loads to and from load and unload surfaces, and in or out of washers or sterilizers in particular. Modules of current systems also are noisy and hinder maintenance of adjacent washers or sterilizers. Control of current modular systems, including communication between modules, often is accomplished by complex microprocessors or programmable logic controllers. These control systems are expensive, both to install at the outset and to change or reprogram if alterations are necessary. A simpler and less expensive control system, however, would be sufficient for healthcare uses.

The present invention provides a modular, automated transport system that is particularly suited to transporting medical articles as part of a washing or sterilization process. The system transports the articles with minimal human intervention, thereby reducing the risk of contamination or injury. The modules of the present invention can be easily arranged in various configurations to accommodate the needs of any particular location. Each module has novel pusher/puller mechanisms capable of transferring baskets of medical articles into and out of washers or sterilizers, or between adjacent modules, without complex microprocessor or similar control mechanisms that need to be reprogrammed to accommodate changes. The present invention, therefore, provides a more simple, less expensive means for transporting articles, particularly as part of a washing or sterilization process, than transport systems existing in the art.

SUMMARY OF THE INVENTION

The present invention relates to a modular automated transport system for transporting articles from one location to another. Articles can be transferred between modules or between modules and adjacent load or unload surfaces. The present invention is particularly suited to transporting baskets of medical instruments and devices in a healthcare setting as part of a washing or sterilization process. Each module has a frame including a cabinet that houses a drive mechanism. The drive mechanism causes a plurality of rollers to turn, thereby causing any article on the rollers to move longitudinally from one lateral side of module to the other. Each module also has unique pusher mechanisms to push articles off a module to another module, load table, washer, or like device, and unique puller mechanisms to pull articles onto a module. A pusher and a puller mechanism can be combined into a single pusher/puller mechanism. Modules also are equipped with gates for optimally positioning articles on the module.

Each module has its own controller. A communication mechanism permits one module to detect an article on an adjacent module. That information is received by the controller, which in turn controls the precise sequence of operation of the other mechanisms on the module. The modules are electrically connected and completely compatible. Modules, therefore, can be added or removed in minutes without the need for complex reprogramming of the controller.

DETAILED DESCRIPTION OF THE INVENTION

The present invention is an automated transport system comprising one or more modules. The modules are positioned adjacent to one another extending from an instrument handling area to a washer, sterilizer, or like device. It is understood that any number of modules can be arranged between any configuration of washers, sterilizers, handling areas, or other locations. Often, two or three modules is sufficient for a given handling area, but there is no limit to the number of ways in which the modules can be arranged.

Figure 1:
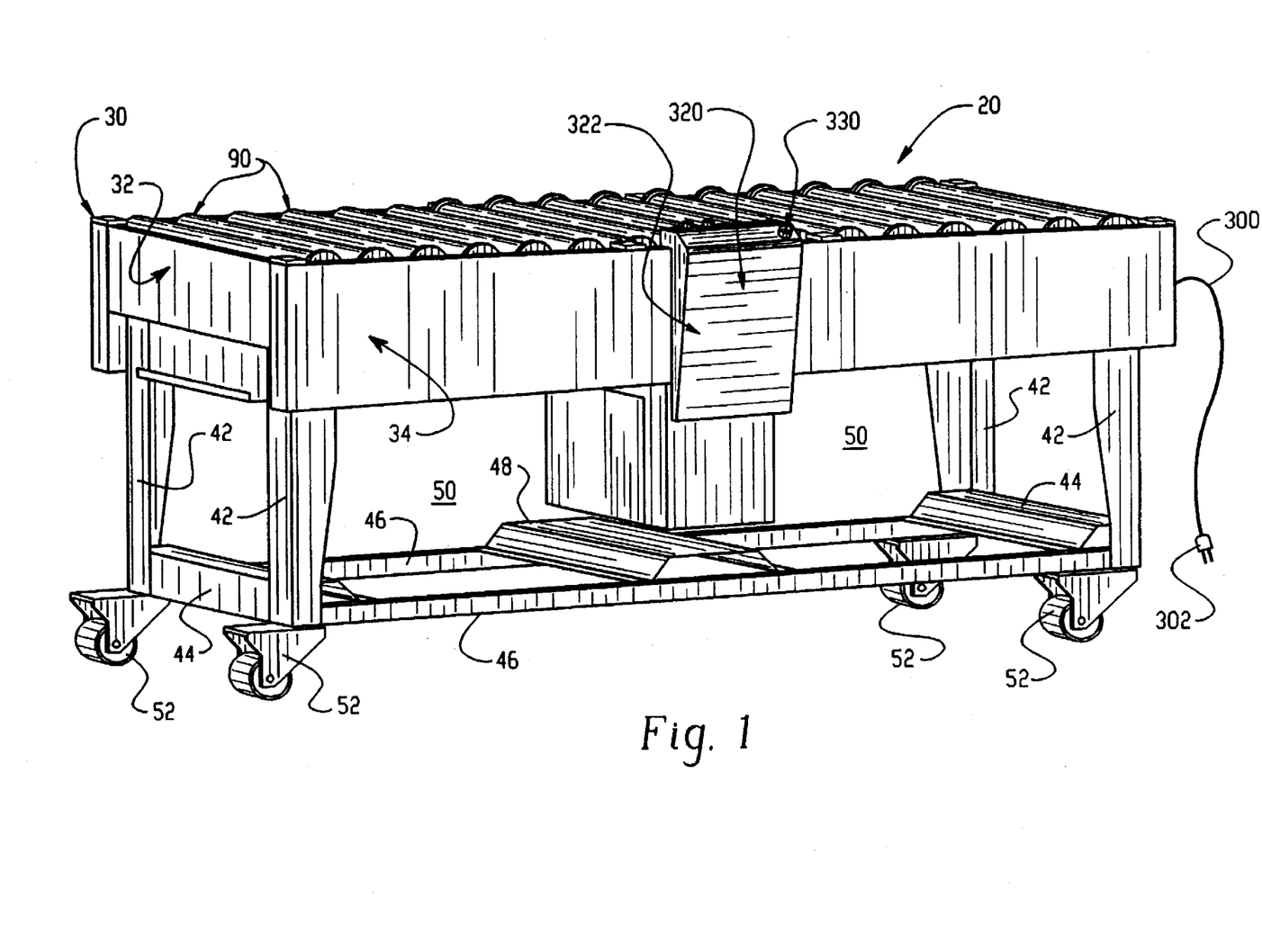
FIG. 1 depicts a single module in the automated transport system of the present invention.

Referring now by reference numerals in the drawings, a single module 20 is depicted in FIG. 1. In the preferred embodiment, the modules are sized to optimally facilitate the transport of baskets (not shown) containing medical instruments or devices. Such baskets are well known in the art and generally are comprised of steel rods welded together in a mesh-like fashion. Additional steel rods are formed to create racks within the basket for holding medical instruments and other devices. Such baskets standardly are 24×24 inches in size. Each module, therefore, preferably is at least 24 inches wide, and preferably several inches wider, to accommodate such baskets. The length of the modules preferably is 70 inches. This length is small enough to permit flexibility in arranging modules, but not so small so as to require an unreasonable number of modules for usual needs. Modules optionally can be provided with add-on extensions to increase length to suit particular needs. It will be appreciated that the precise size of the modules is not critical to the invention and may vary depending upon the precise needs of the user. Each module contains the following component parts, which will be described in detail: a frame, a cabinet, a drive mechanism, one or more gates, one or more pushers, one or more pullers, and an electrical controller.

Figure 2:
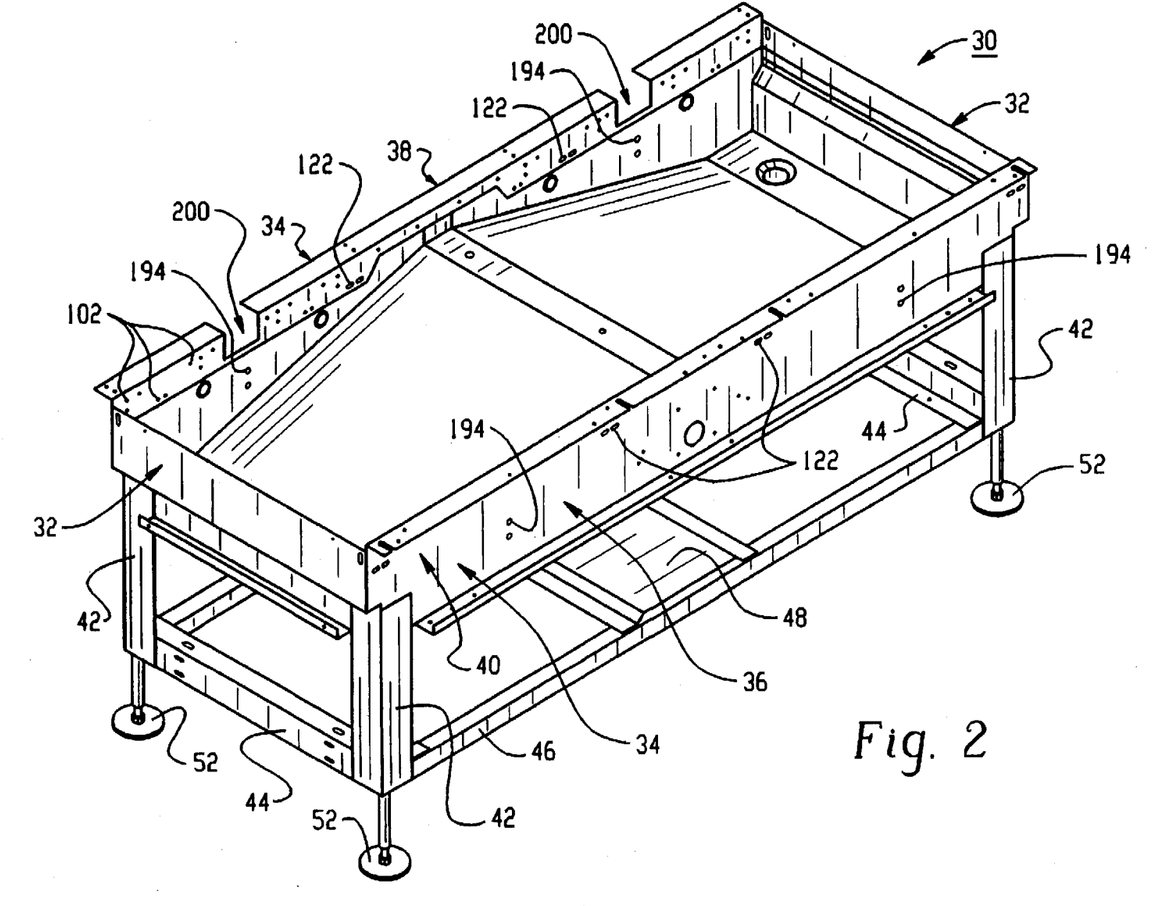
FIG. 2 is top-side view of the frame of a module.

Frame 30, depicted in FIG. 2, provides a support structure for the module. Various frames for sections of conveyor systems are well known in art and are usable in the modules of the present invention. In the preferred embodiment, the frame is made of stainless steel and has additional features particularly suited for the transport and handling of medical articles. The frame is designed to support loads of 600 pounds or more so that more than one fully loaded basket can be placed on a module at one time. Frame 30 includes lateral sides 32 and longitudinal sides 34 on opposite ends of the frame. One longitudinal side comprises service side 36 and the opposite side comprises non-service side 38. Service side 36 defines cabinet 40 (best seen in FIG. 3) that houses the drive mechanism. The service side thereby shields the drive mechanism from water, dust, and other contaminants that may corrode or interfere with the drive mechanism.

Frame 30 further includes four legs 42 extending vertically downward from each junction of the lateral and longitudinal sides. Frame 30 is further reinforced by cross bars 44, side bars 46, and central support 48. The various components of the frame define open areas SO (see FIG. 1) for the storage of empty baskets that rest on top of side bars 46. Each leg ends in an adjustment means 52 that permits easy relocation of the modules. Preferably, the legs are equipped with adjustable swivel castor wheels, as seen in FIG. 2. The wheels are provided with any standard locking means (not shown) known in the art to prevent unwanted movement of the module. Other forms of adjustable legs can be provided. Moveable wheels and adjustable legs for tables, carts, and the like are well known in the art, and any such devices can be used with the modules of the present invention.

Figure 3:
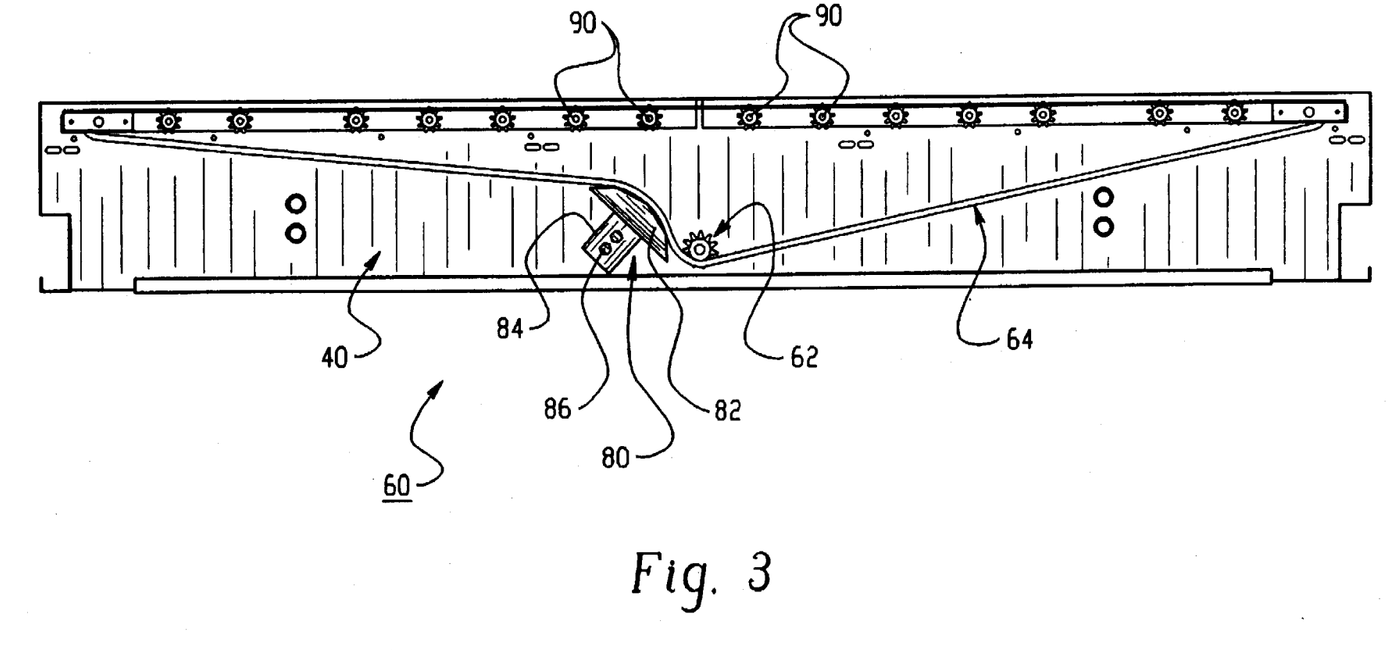
FIG. 3 is a side view of the drive mechanism located on the service side of a module.
Figure 4:
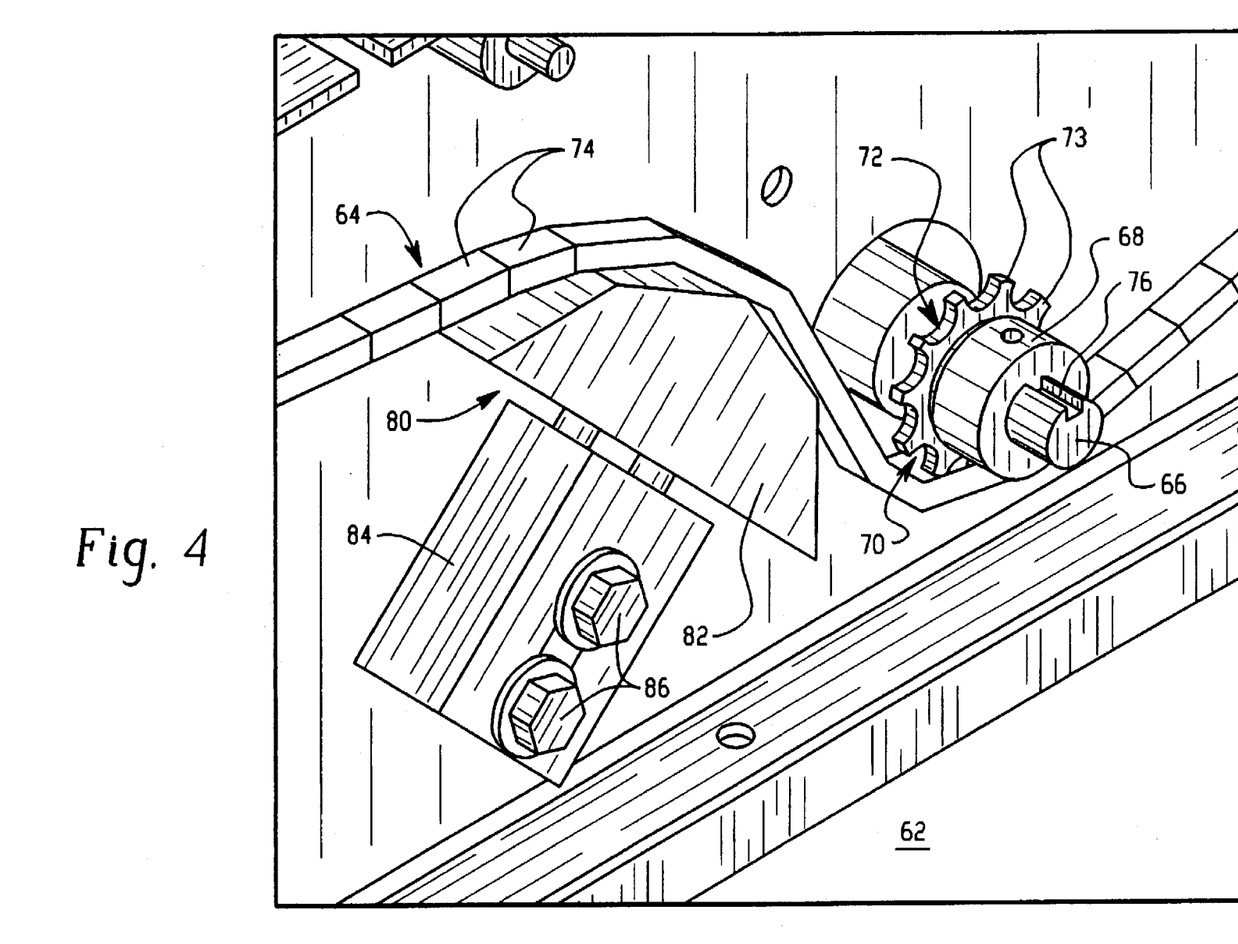
FIG. 4 is a closeup view of the gearmotor portion of the drive mechanism.

As stated above, drive mechanism 60 is housed within cabinet 40 of service side 36. The drive mechanism, depicted in FIGS. 3 and 4, provides the means by which articles are transported from one lateral side of the module to the other. In the preferred embodiment, the drive mechanism comprises gearmotor 62 that drives a roller chain 64. A 1/16 hp gearmotor with 278 lbs.-in. of torque, and a #35 roller chain, are most suited for use in the present invention. The gearmotor is depicted in detail in FIG. 4. Gearmotor 62 includes a shaft 66 that extends outward from the frame. Encircling the shaft is 9-teeth sprocket 70 having hub 68 and teeth ring 72. The roller chain is made of individual links 74 that cooperate with the individual teeth 73 of the teeth ring. The gearmotor is provided with a key slot 76 that can receive a brass safety key (not shown). The key prevents slippage between the shaft and the sprocket and acts as an added safety feature. If obstruction of the chain occurs, the brass key will shear, allowing the gearmotor shaft to turn without turning the sprocket. In normal operation the gearmotor causes the 9-teeth sprocket to turn, which drives the chain via the cooperating chain links. The roller chain is held in tension by bender 80 located adjacent to gearmotor 62. Bender 80 includes wedge 82 supported by box 84. Box 84 is bolted to the frame using bolts 86.

Figure 5:
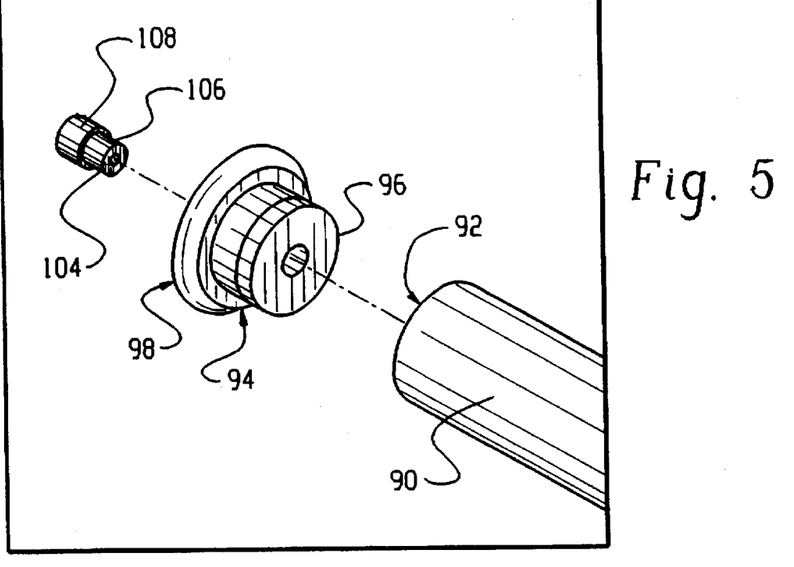
FIG. 5 depicts the connection of a roller on the non-service side of a module.
Figure 6:
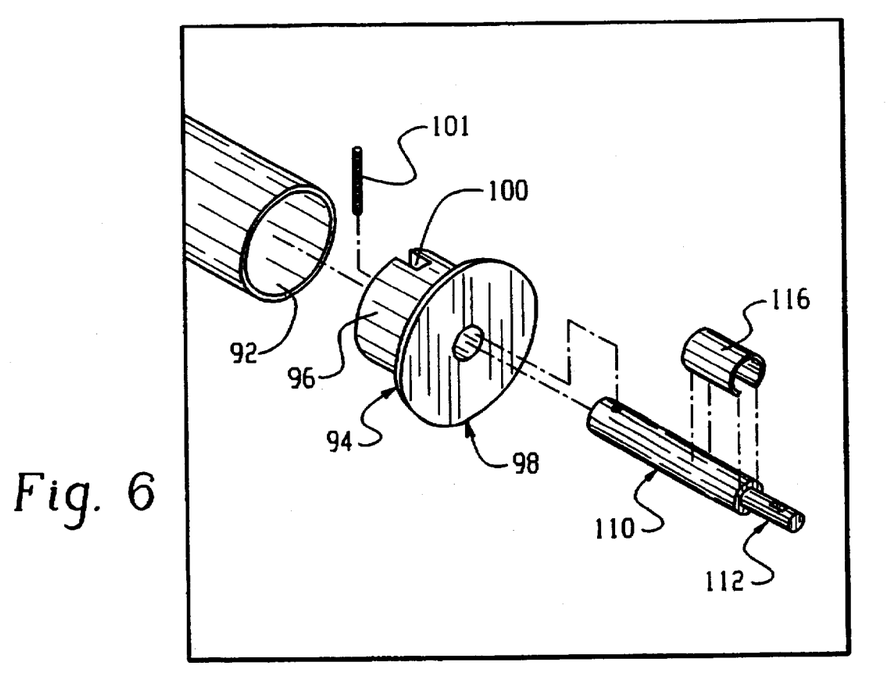
FIG. 6 depicts the connection of a roller on the service side of a module.
Figure 7:
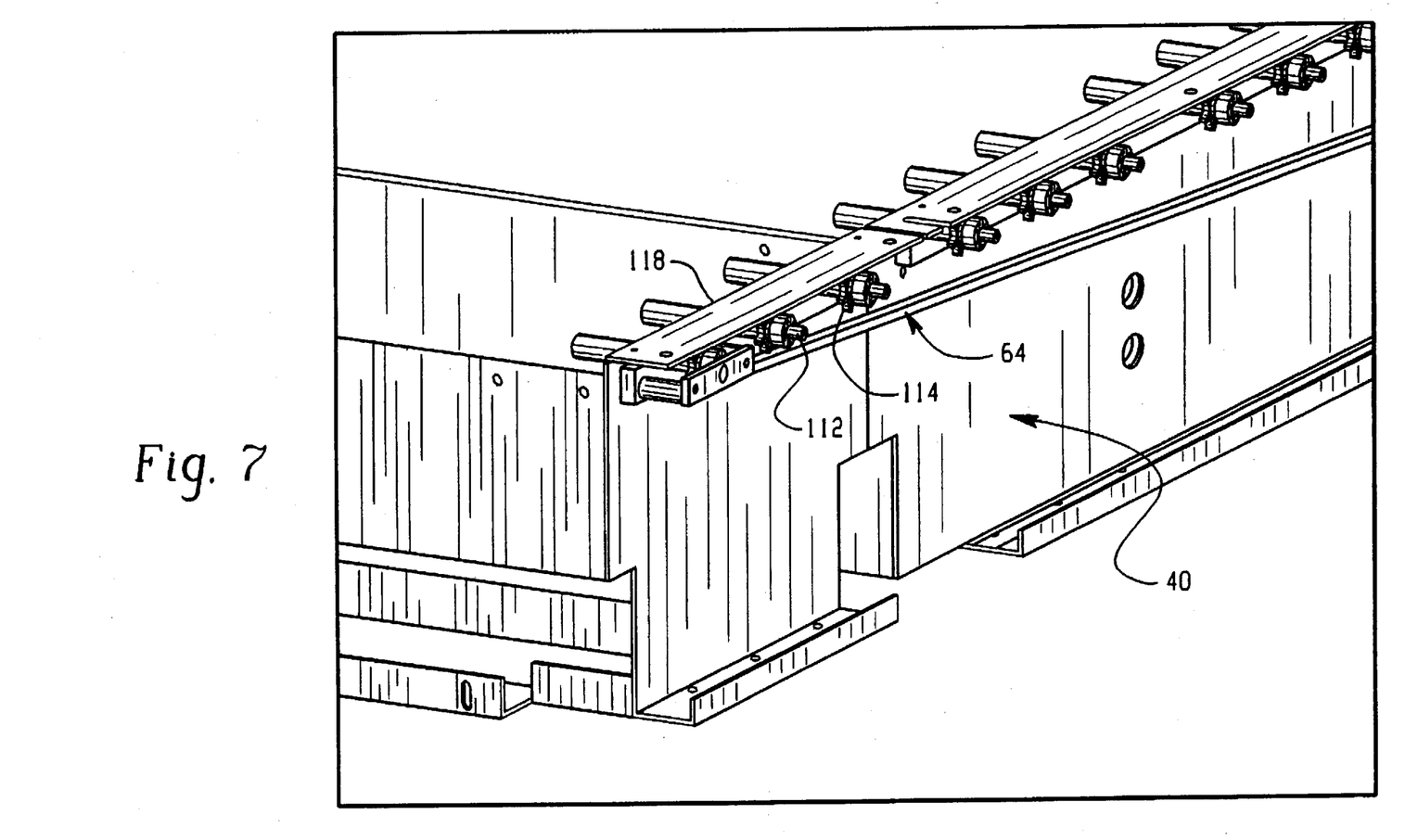
FIG. 7 depicts how the rollers are attached to the frame on the service side of a module.

As seen in FIG. 3, roller chain 64 extends around a plurality of rollers 90. To best accommodate the transport of baskets containing medical articles, each roller is composed of a 24 in. long PVC cylinder to match the width of a basket. The attachment of the rollers on the non-service side of the frame is depicted in FIG. 5. End 92 of the roller is hollow and receives shoulder 94. Shoulder 94 comprises internal diameter 96, which is inserted into end 92, and flange 98. Flange 98 helps guide the baskets as they move along the module. Non-service side 38 contains a plurality of bolt holes 102 (see FIG. 2). Pin 104, having small diameter portion 106 and large diameter portion 108, is bolted to the frame at a bolt hole and the small diameter portion is inserted in the shoulder 94. The internal diameter is able to turn with the roller when the roller is driven by the chain. On the service side 36, roller 90 is attached using rod 110, as seen in FIGS. 6 and 7. Rod 110 ends in extension 112 which can be fitted with 9-teeth sprocket 114 (see FIG. 7). At the other end of shaft 110, shoulder 94 contains a slot 100 that receives headless screw 101. The headless screw permits the shoulder to turn. Rod 110 also turns with the rest of the assembly. The rod is also provided with snap 116 that maintains the position of the shoulder along the shaft. When the snap is removed, the shoulder is free to slide along the shaft, thereby permitting removal of the roller for cleaning and maintenance. In operation, 9-piece sprocket 114 of each roller cooperates with links 74 of roller chain 64. Although the precise number of rollers is not critical to the invention, the embodiment depicted in the figures contains sixteen rollers.

The drive mechanism operates as follows. When activated, the gearmotor drives the roller chain so that it moves about the sprockets of the rollers. This causes the rollers to turn, thereby causing any object on top of the rollers to move longitudinally along the module. The drive mechanism can be operated in either direction depending upon the desired direction of transport. Although the preferred embodiment of the drive mechanism has been described, it is understood that rollers and roller drive chains for conveyor systems are commonly known in the art, and any such roller conveyor systems can be used with the system of the present invention.

Figure 8:
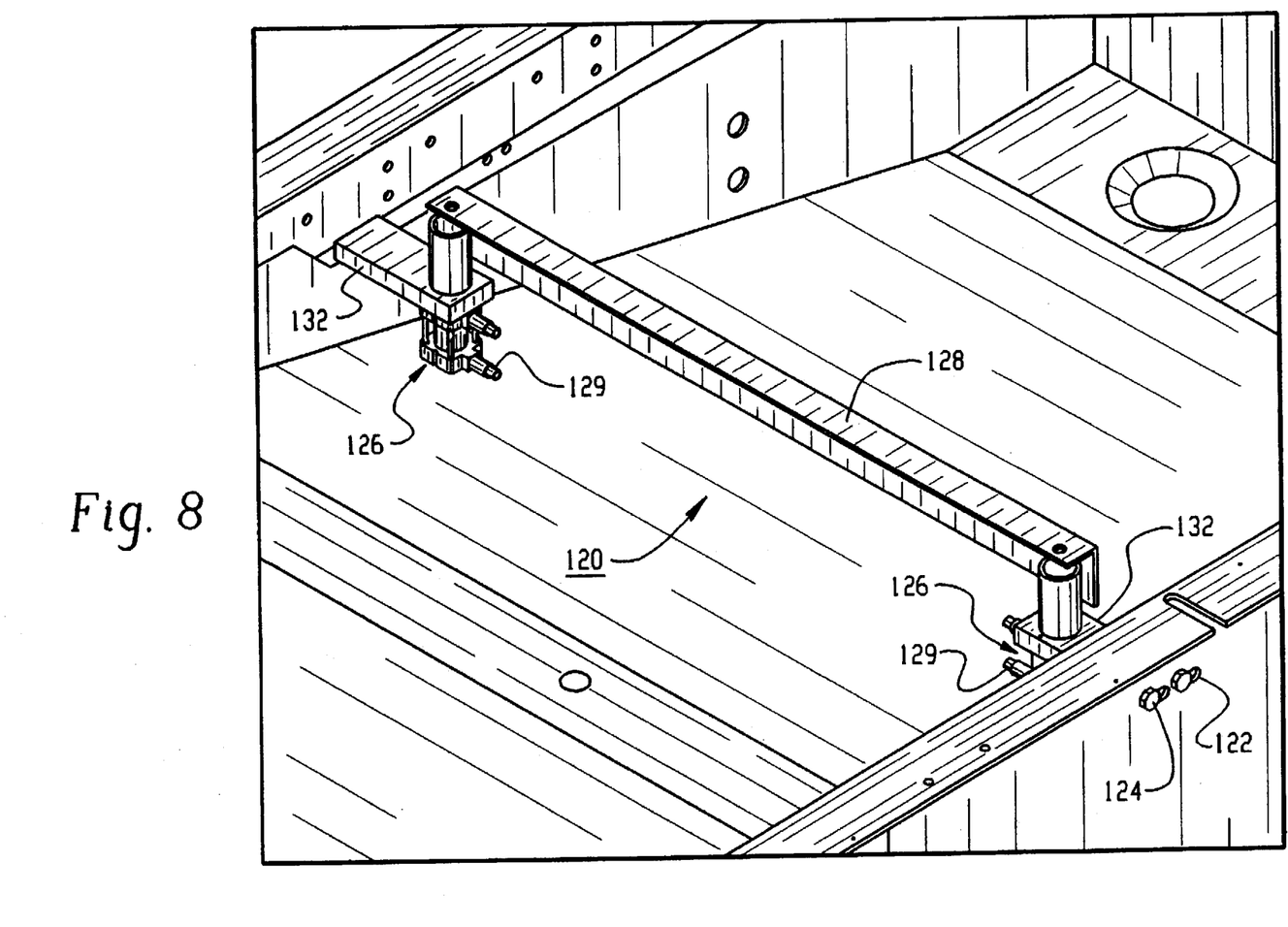
FIG. 8 is a top-front view of a gate mechanism.

Each module also includes gates 120, depicted in FIG. 8, to position loads on the module when the loads are to be transferred from a module to a table, washer, sterilizer or like device. Preferably, each module has two gates, one located just slightly more than 24 in. from each lateral side to accommodate baskets of medical devices. The positioning of the gates within the frame is best depicted in FIGS. 2 and 8. The frame has two sets of gate slots 122 on each longitudinal side. The slots receive bolts 124 that support the gates within the frame.

The gates, depicted in detail in FIG. 8, are each comprised of at least one, and preferably two, pneumatic air cylinders 126 and a barrier 128 extending between the cylinders. Preferably, the barriers are roughly the same length as the rollers and are made of stainless steel. The gates are supported by plates 132 which are bolted to the frame at slots 122. Pneumatic air cylinders are well known in the art and are pressurized with air through tubing adaptors 129. Air tubes (not shown) are connected to the tubing adaptors to provide air to the cylinders. To avoid injury, the air pressure used can be as low as 30 psi.

The gates are used to position a basket for lateral transfer of the basket from a module as follows. As the basket moves into position, the pneumatic air cylinders 126 are pressurized causing the cylinders to raise. This, in turn, raises carrier 128 above the level of the rollers to stop the movement of a basket and to position it on the module. The precise stroke of the cylinders is not critical so long as the stroke is sufficient to raise the level of the barrier above the rollers. The raising of the cylinders can be regulated by stoppers that surround the cylinders. When the cylinders are raised, the stoppers press up against plates 132 to prevent additional upward motion. The barrier and cylinders can be covered with an elastomeric bumper to absorb the impact with the basket. This prevents wear on the gate and basket and reduces the noise level. Once positioned, the basket can be laterally transferred by a pusher or puller as described below.

Pusher 140 is used to push a basket laterally from a module to another module, load table, washer, sterilizer, or like device. Pusher 140 is depicted in FIGS. 9–12. The pusher is made of a corrosion resistant material, such as aluminum or stainless steel. To push a basket completely off a module, the pusher must be able to push a basket a distance at least equal to the width of a basket plus the width of the top surface of the longitudinal side of the frame. Generally, this distance is about 32 inches. In the preferred embodiment, the required displacement is accomplished using a combination of air cylinders.

Figure 9:
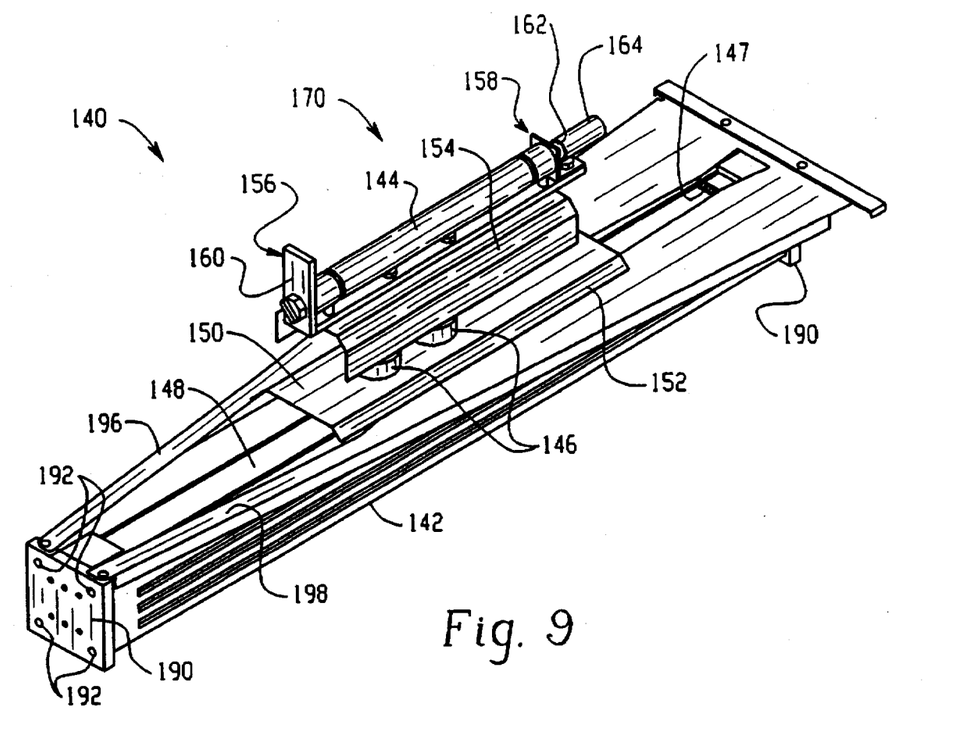
FIG. 9 is a top-side view of a pusher.
Figure 10:
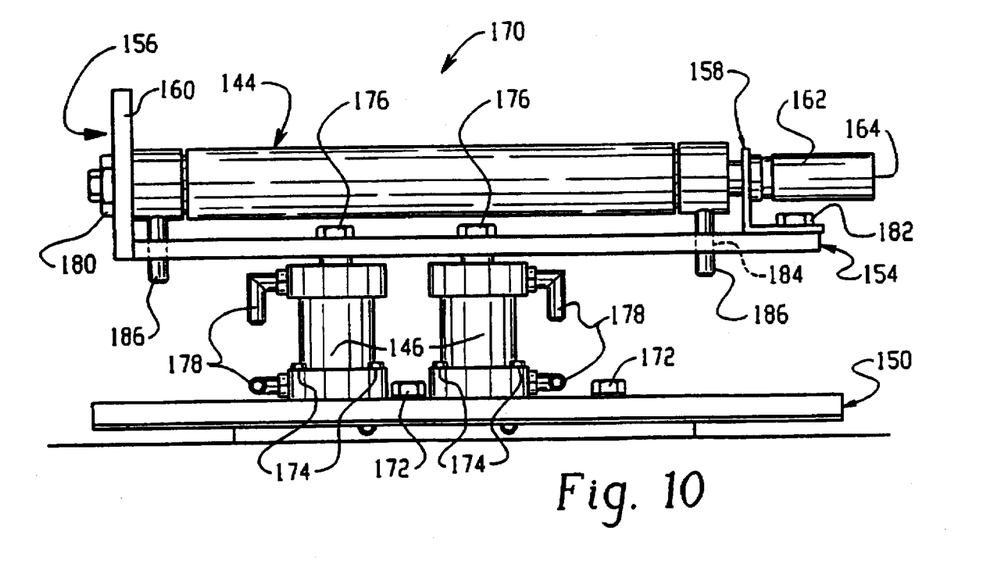
FIG. 10 is a side view of the upper portion of a pusher.

As best seen in FIGS. 9 and 10, the pusher includes rodless cylinder 142, secondary cylinder 144, and elevation cylinders 146. As with the gate, at least one elevation cylinder is required, and two are preferred. Rodless cylinder 142 acts as the base of the pusher and defines track 148. Lower bracket 150 is mounted on the rodless cylinder and supports the elevation cylinders. The lower bracket ends in baffles 152 that help protect the track and rodless cylinder from contaminants. Upper bracket 154 is secured atop the elevation cylinders. Upper bracket 154 comprises back end 156 and front end 158. The back end extends upward to form flange 160. Secondary cylinder 144 is bolted to the upper bracket by any method known in the art. Secondary cylinder 144 houses rod 162 ending in nose 164. The assembly 170 comprising the lower bracket, elevation cylinders, upper bracket, and secondary cylinder is slidably movable within track 148 of the rodless cylinder.

The various connections within assembly 170 are best depicted in FIG. 10. Lower bracket 150 is secured to the rodless cylinder by bolts 172. Similarly, the elevation cylinders are secured to the lower bracket by screws 174, and the upper bracket is secured to the elevation cylinders by bolts 176. The secondary cylinder is secured to the upper bracket by bolts 180 and 182. Upper bracket 154 also has holes 184 to receive extensions 186. Elbows 178 and extensions 186 provide connections for air tubes (not shown) to provide air to the various air cylinders.

Figure 11:
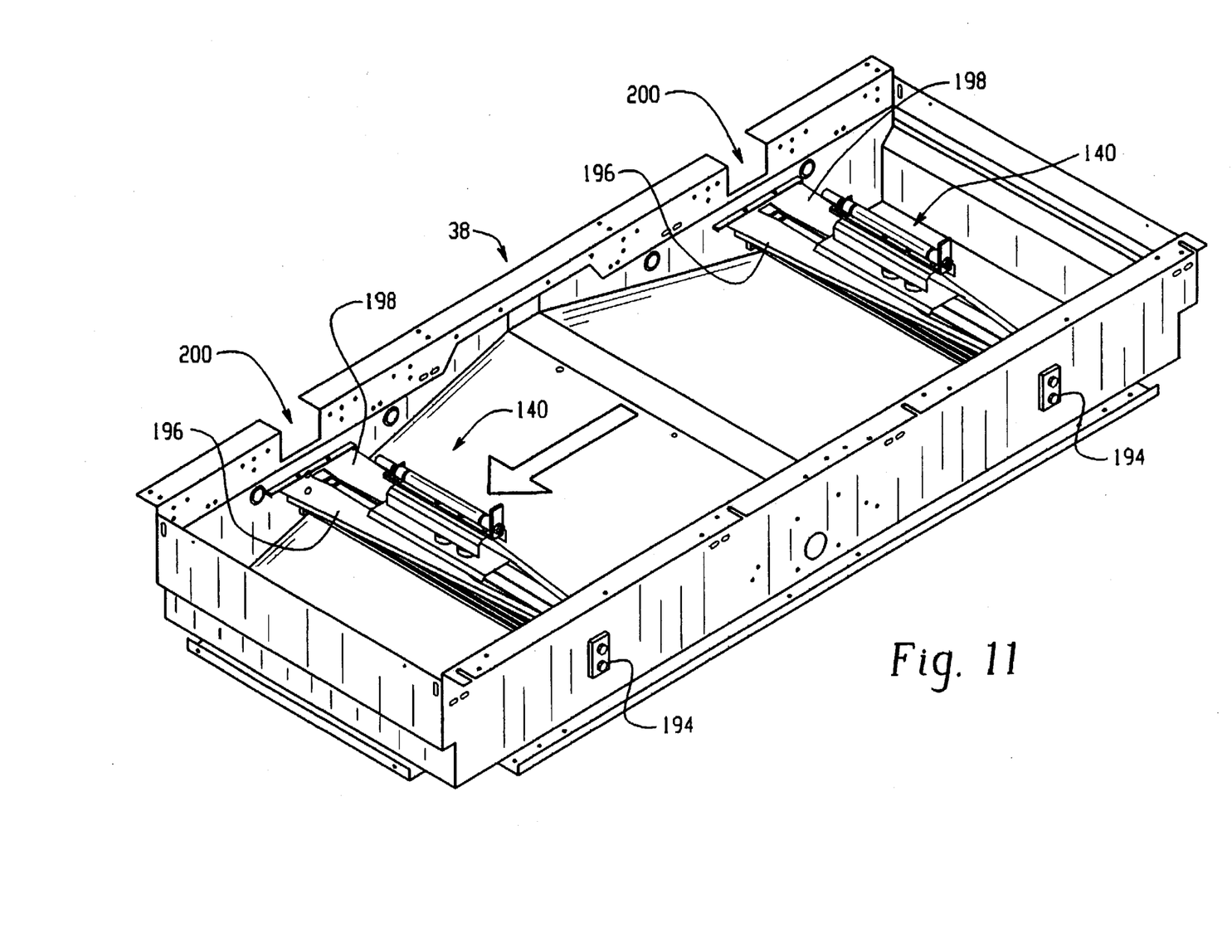
FIG. 11 depicts how the pushers are located within the frame of a module.

FIGS. 2, 9, and 11 demonstrate how the pusher is mounted within the frame. Pusher 140 is fitted with two mounting plates 190 having screw holes 192. Screw holes 192 match up with corresponding screw holes 194 in the frame by which the pusher may be screwed or bolted to the frame in a manner commonly known in the art. Left protector 196 and right protector 198 are mounted atop the rodless cylinder about the track. The protectors shield the rodless cylinder from contaminants and preferably are wider where the basket leaves the module where greater protection is needed. Track 148 is provided with spring 147 that pulls the left and right protectors together when the rodless cylinder retracts. A pusher is mounted roughly 12 in. from a lateral side so that it is located in line with the center axis of a basket properly positioned by a gate. Non-service side 38 of the frame has openings 200 aligned with the pushers. The openings permit a pusher to extend beyond the frame to contact items on adjacent tables, modules, washers, or like devices. The components for mounting and protecting the pusher can be made of any suitable noncorrosive material, such as stainless steel.

Figure 12:
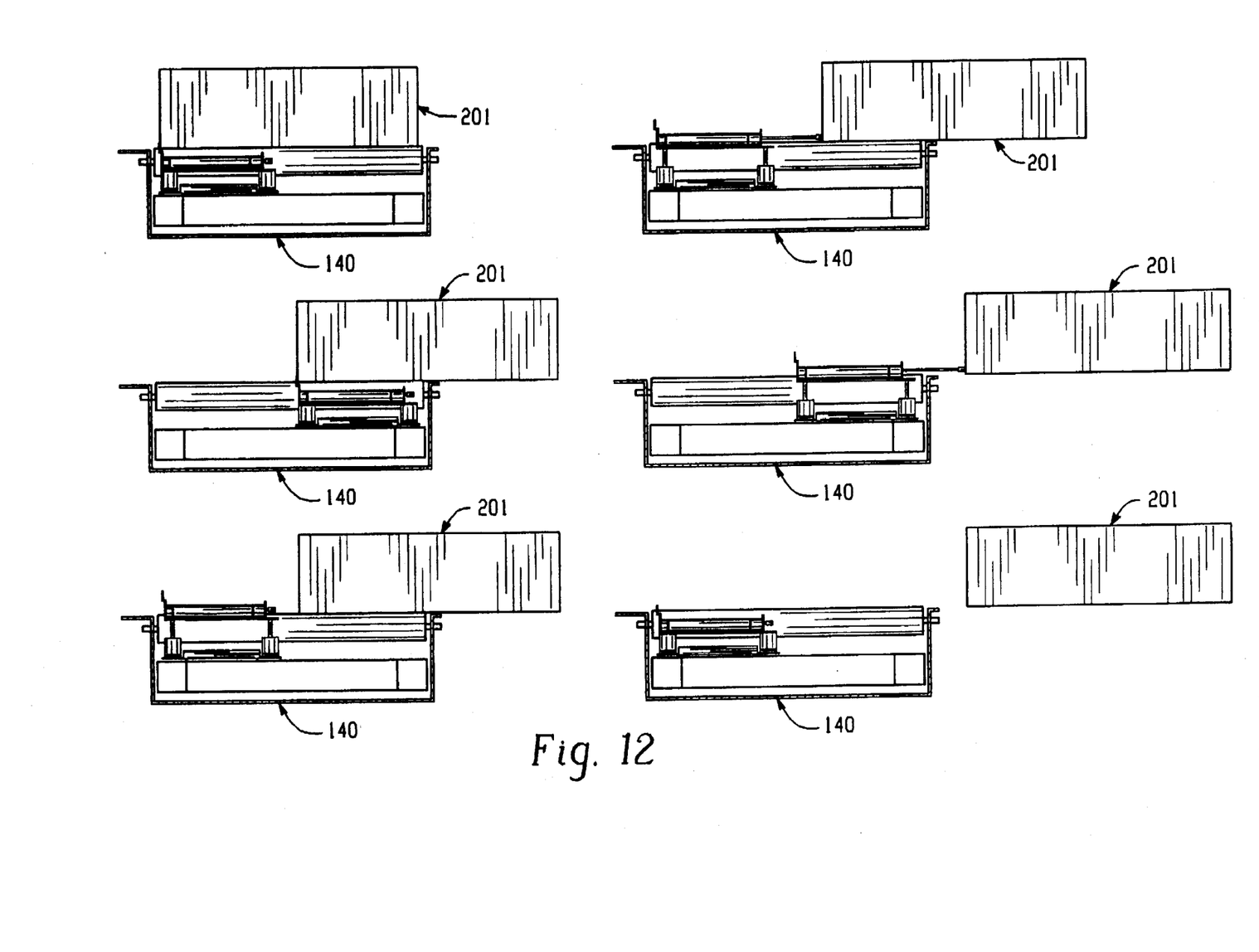
FIG. 12 is a graphical depiction of the pusher sequence for pushing an article off of a module and onto an adjacent surface.

As stated above, the pusher transfers a basket laterally from a module to another module, load table, washer, or like device. The desired pushing distance can be achieved using a 13 in. stroke rodless cylinder, a 6 in. stroke secondary cylinder, and 1¼ in. stroke elevation cylinders. A basket can be transferred from the module using the following sequence of extensions and retractions of the various cylinders, which are depicted graphically in FIG. 12. At the beginning of the sequence, a basket is positioned by the gate above a pusher with all cylinders retracted. In this initial position, the pusher is below the level of the basket, except for upwardly extending flange 160 which rests adjacent to the base of the basket. Rodless cylinder 142 is extended, thereby causing assembly 170 to move within track 146. As assembly 170 moves, the flange pushes the basket resulting in a 13 in. displacement of the basket. The rodless cylinder is then retracted returning the pusher to the initial position. Next, the elevation cylinders are extended causing the secondary cylinder to rise 1¼ in. When raised, nose 164 rests adjacent to the base of the basket. Rodless cylinder 142 is extended again moving assembly 170 along the track, with nose 164 pushing against the basket to provide another 13 in. displacement. The secondary cylinder also extends moving rod 162 and nose 164 outward to provide an additional 6 in. displacement, for a total 32 in. displacement. This is sufficient to move the basket off of the module. Flange 160 and nose 164 can be fitted with an elastomeric material to prevent wear on the pusher and basket and to reduce noise level. The pusher sequence is summarized in the following table:

| Pusher Sequence | Rodless cylinder. | Elevation cylinder | Secondary cylinder | Basket displacement |
|---|---|---|---|---|
| 1 | extend | | | 13" |
| 2 | retract | | | 13" |
| 3 | | extend | | 13" |
| 4 | extend | | | 26" |
| 5 | | | extend | 32" |
| 6 | retract | | | 32" |
| 7 | | | retract | 32" |
| 8 | | retract | | 32" |

Figure 13:
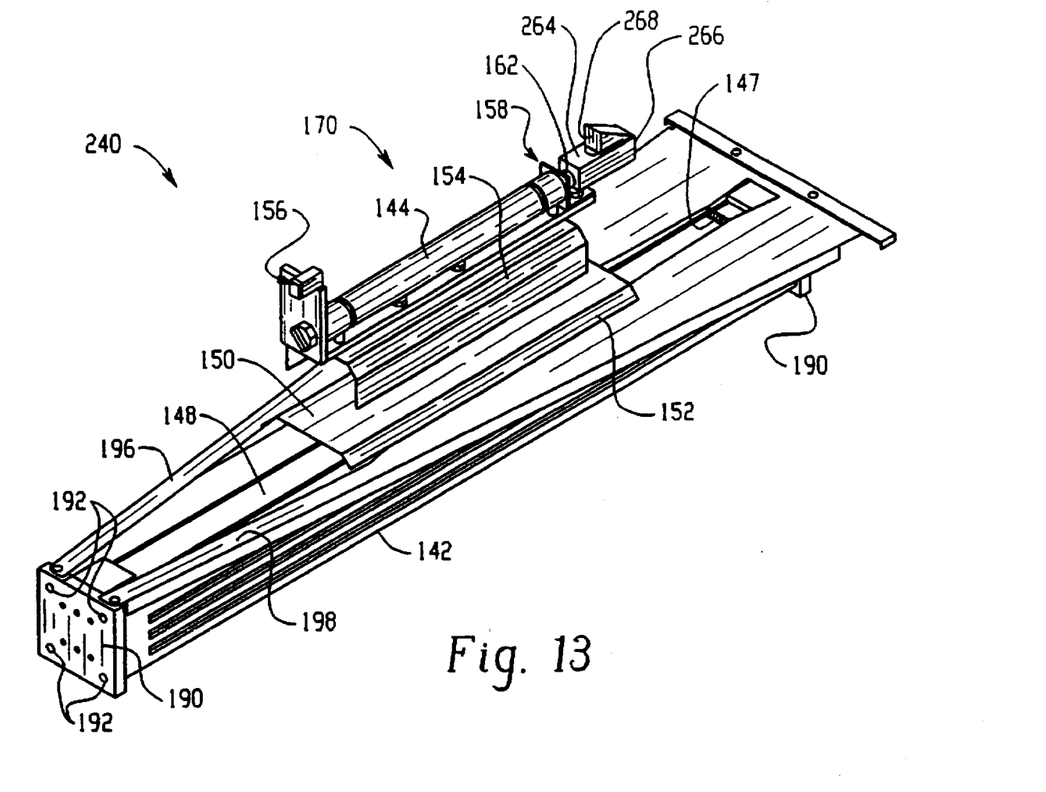
FIG. 13 is a top-side view of a puller.
Figure 14:
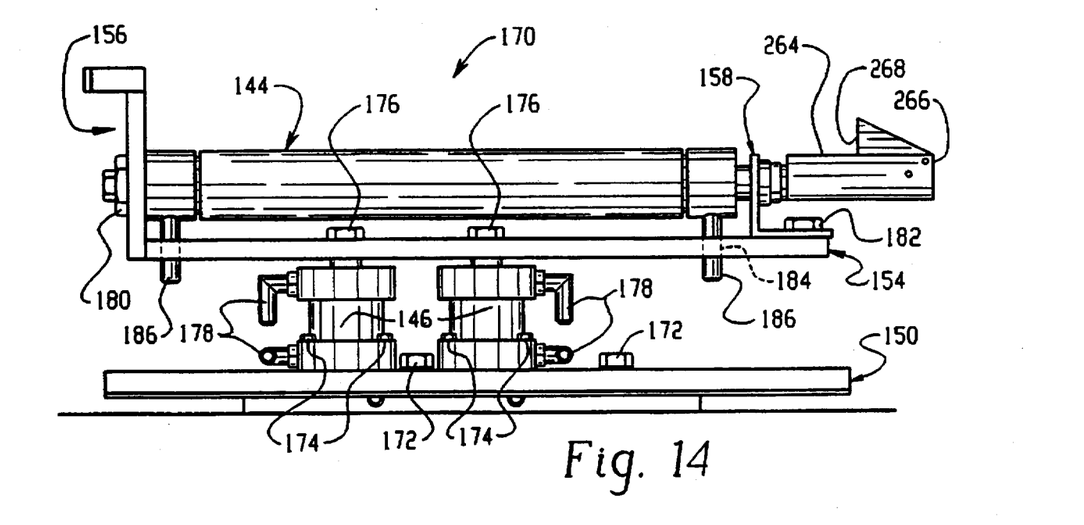
FIG. 14 is a side view of the upper portion of a puller.

The module also can be provided with one or more pullers 240. Puller 240 is depicted in FIGS. 13 and 14. A puller is used to pull a basket onto a module from another module, load table, washer, or like device. Generally, puller 240 is structurally the same as pusher 140 and is mounted to the frame in the same manner. Puller 240, however, has a clip 264 instead of nose 164 at the end of rod 162. Clip 264 has grabbing teeth 266, ridge 268, and operates between an open and closed position. When closed, the grabbing teeth encircle and hold onto an element of the basket. The pusher sequence can be modified to form a puller sequence as follows. Starting from the same initial position, all cylinders are extended resulting in clip 264 being in proximity to a basket on an adjacent module or other device. Clip 264 is then closed whereby the grabbing teeth grab the basket. The rodless and secondary cylinders are then retracted whereby the basket is displaced a total of 19 in., partially pulling the basket onto the module. The elevation cylinders are then retracted to move the puller to its initial position. The rodless and elevation cylinders are extended again in turn, whereby ridge 268 is positioned on the inside of one of the rods in the base of the basket. The rodless cylinder is again retracted, and the ridge pulls the basket displacing it the remaining 13 in. for a total of 32 in. The elevation cylinders then retract returning the puller to its initial position. The puller sequence is summarized in the following table.

| Pusher Sequence | Rodless cylinder. | Elevation cylinder | Secondary cylinder | Basket displacement |
|---|---|---|---|---|
| 1 | extend | | | 0" |
| 2 | | extend | | 0" |
| 3 | | | extend | 0" |
| 4 | | | retract | 6" |
| 5 | retract | | | 19" |
| 6 | | retract | | 19" |
| 7 | extend | | | 19" |
| 8 | | extend | | 19" |
| 9 | retract | | | 32" |
| 10 | | retract | | 32" |

The specific stroke sizes and sequences described above for the pushers and pullers constitute the preferred embodiment for the operation of the present invention. It is understood, however, that different stroke sizes and sequences can be used without departing from the principles of the invention. As with the cylinders of the gate, the air pressure for operating the various cylinders on the pushers and pullers can be as low as 30 psi to prevent injury. Each module should have at least one pusher and one puller. In an alternative embodiment, clip 264 in the closed position can act as nose 164 in the pusher sequence. In addition, both flange 160 and ridge 268 are provided to either push or pull a basket. In this manner, the pusher and puller can be combined into a single pusher/puller mechanism.

The modules are connected together to form an automated transport system as follows. Each module is equipped with power cord 300 ending in male plug 302. Each module also has female receptacle (not shown). The male plug of one module is placed in any standard wall outlet. The male plug of an adjacent module is then plugged into the female receptacle of the first module. Additional modules may be added, the male plug of each being plugged into the female receptacle of the previous module in the line. Thus, there is only a single point of electrical supply and power is transferred from module to module via the power cords. Similarly, any module may be equipped with pressurized air supply in a manner that is well known in the art. Each module can be equipped with an air inlet 312 and air outlet 314. An air hose connects the air outlet of a module to the air inlet of a subsequent module. In this manner, a single air supply located in the first module in the line can source all subsequent modules via the air hoses. As discussed previously, the various gate, pusher, and puller cylinders are adapted to receive air tubes to supply the cylinders with pressurized air for operation.

Figure 15:
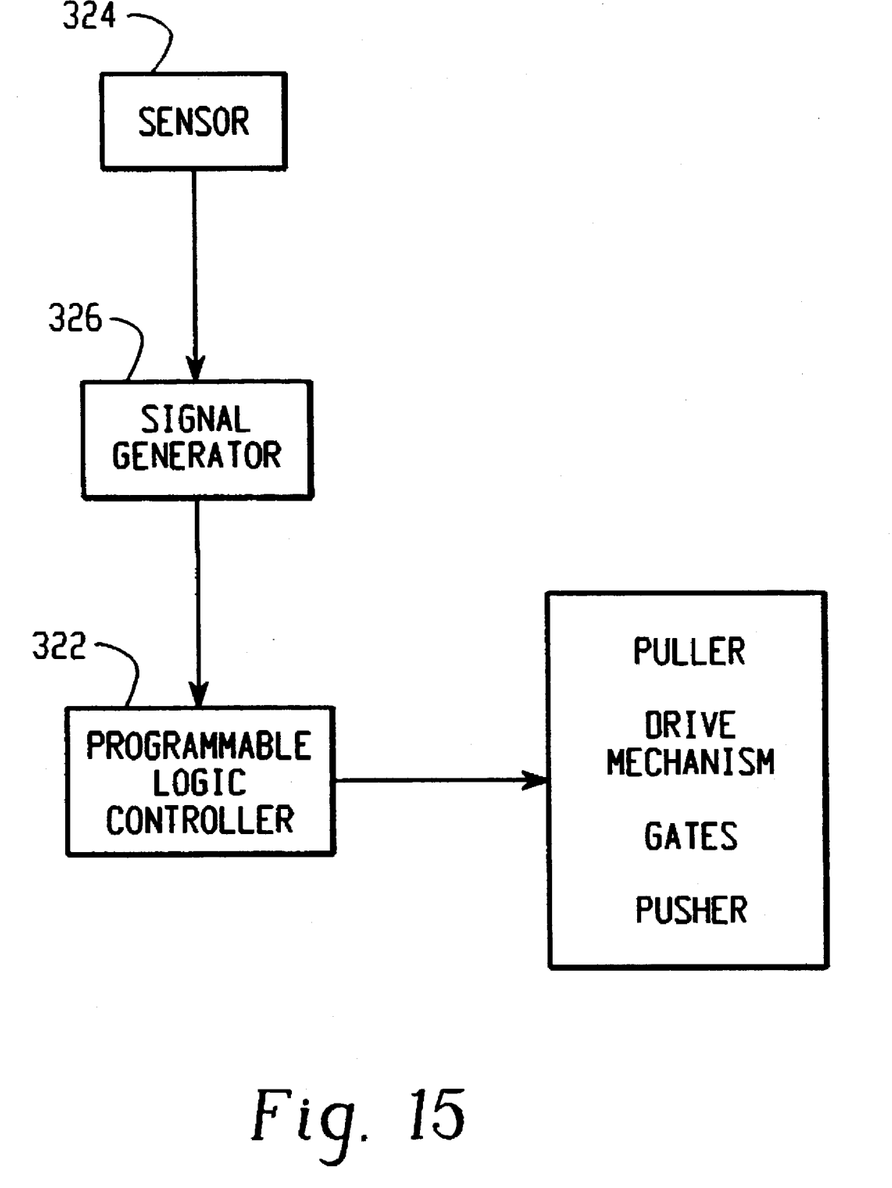
FIG. 15 is a block diagram of the control mechanism of a module.

FIG. 15 is a block diagram of the control mechanism of the present invention. Each module is equipped with controller 120 for controlling the system and providing communication between modules. The controller includes a programmable logic controller (PLC) 322. Although PLCs are well known in the art, the PLC in the present invention is simpler than prior conveyor system PLCs because they are completely compatible with other modules at the outset such that reprogramming is never required. This is accomplished because communication between modules is limited to knowing the presence of an article on an adjacent module. When an article moves onto a module, sensor 324 detects the article causing a signal to be produced by signal generator 326. The signal travels to adjacent modules through multipin connectors 328 to the PLC of the adjacent modules. As the article approaches from the previous module in the sequence, the PLC sets and controls the appropriate puller, driving, gate, and pushing sequences as needed to move the article and transfer it to the next module. Any module can be removed from the line in only a few minutes by unplugging its air hose, power cord, and multipin connector from adjacent modules. Since all modules are compatible, remaining modules can be connected in the manner described above to fill the gap. Similarly, modules may be added, or the transport pathway altered, without reprogramming the PLCs.

Each module is equipped with start/stop knob 330. The system is turned on by pulling start/stop knob 330. Since all the modules are electrically connected, the entire system is turned on by pulling the start/stop knob on any of the modules. Likewise, the entire system is shut down by pushing the start/stop knob of any one module down to the off position. This acts as a safety mechanism since the entire system can be shut down if there is an obstruction or other malfunction anywhere in the system. As an added safety feature, the multipin connectors comprise a closed loop circuit that prevents unwanted movement of articles while one of the modules is disconnected.

The automated transport system of the present invention is particularly suited to transporting baskets of medical instruments and devices as part of a washing or sterilization process. An operator fills a basket with soiled medical articles on a load table, and then activates the system. Under control of the PLC, a pusher/puller pulls the basket from the table onto a first module. The drive mechanism then moves the basket longitudinally along the module. Simultaneously, the first module communicates the presence of the basket to an adjacent second module. The gates are used to properly position the basket for transfer to the next module. A pusher/puller on the first module then pushes the basket onto the second module. Alternatively, a pusher/puller on the second module can pull the basket from the first module. The basket is then transferred from module to module in like manner. Although any number of modules can be used, in most settings two or three modules should be sufficient. In addition, the system can transport numerous baskets at one time when pulled sequentially from the table. The last module in the system is adjacent to a washer or sterilizer. A pusher/puller on the last module pushes the basket into the washer or sterilizer. When the washing or sterilization process is complete, the pusher/puller pulls the basket from the washer or sterilizer. The basket is then transported back to the table.

As apparent from the above description, several advantages are provided by the present invention. The operator does not handle the basket or article at any time during transportation. Thus, there is no risk of contamination or injury to the operator from lifting full loads. The modules of the present system are fully interchangeable and compatible. Each module can be added or removed from the system in minutes without complex reprogramming of PLCs or microprocessors. Thus, the system can be rearranged with little effort. The present invention also provides unique and novel pusher/puller mechanisms for transferring articles between modules and to or from tables and other devices, and medical washers and sterilizers in particular.

While a certain preferred embodiment of this invention has been described, it is understood by those skilled in the art that many modifications are possible without departing from the principles of this invention as defined in the claims that follow.

I claim:

1. A modular system for automatically transporting articles from one location to another comprising one or more modules located adjacent to each other, wherein each module comprises:

a frame having opposite longitudinal sides and opposite lateral sides;

a transport surface supported by the frame between the longitudinal and lateral sides of the frame;

at least one article moving mechanism supported within the frame for transversely moving articles between the transport surface and a location adjacent to the module;

a gate supported within the frame for positioning an article on the transport surface;

a drive mechanism for causing motion of the transport surface so that articles located on the transport surface move longitudinally along the module from one lateral side to the opposite lateral side;

a controller for controlling the at least one article moving mechanism puller, gate, and drive mechanism; and a communication mechanism for detecting articles located on the module and communicating the existence of an article on the module to the controller of an adjacent module.

2. A modular system for automatically transporting articles from one location to another according to claim 1 wherein the gate comprises:

at least one elevation air cylinder; and a barrier supported on top of the elevation air cylinder;

whereby when the elevation air cylinder is extended, the barrier is raised above the transport surface to prevent further movement of the article on the transport surface, thereby positioning the article on the transport surface.

3. A modular system for automatically transporting articles from one location to another according to claim 2 wherein the gate has two elevation air cylinders.

4. A modular system for automatically transporting articles from one location to another according to claim 1 wherein the at least one article moving mechanism is a pusher comprising:

a rodless air cylinder defining a track;

an assembly comprising at least one elevation air cylinder supported on top of the rodless air cylinder; a bracket mounted on top of the elevation air cylinder, said bracket including a back end extending upward to form a flange, and a front end; and a secondary air cylinder mounted between the back end and the front end of the bracket, said secondary air cylinder housing a rod that extends outward beyond the front end of the bracket from the secondary cylinder when the secondary cylinder is extended; whereby when the elevation air cylinders are extended, the secondary air cylinder housing the rod is raised; and whereby when the rodless air cylinder is extended, the assembly slidably moves within the track;

whereby the rodless, elevation, and secondary air cylinders can be extended and retracted in a sequence such that the flange and the rod push the article off of the module.

5. A modular system for automatically transporting articles from one location to another according to claim 1 wherein the at least one article moving mechanism is a puller comprising:

a rodless air cylinder defining a track;

an assembly comprising at least one elevation air cylinder supported on top of the rodless air cylinder; a bracket mounted on top of the elevation air cylinder, said bracket including a back end and a front end; and a secondary air cylinder mounted between the back end and the front end of the bracket, said secondary air cylinder housing a rod that extends outward beyond the front end of the bracket from the secondary cylinder when the secondary cylinder is extended; whereby when the elevation air cylinders are extended, the secondary air cylinder housing the rod is raised; and whereby when the rodless air cylinder is extended, the assembly slidably moves within the track; and a clip at the end of the rod having grabbing teeth and a ridge extending upward from the clip, said clip being operable in a closed position in which the grabbing teeth hold on to the article and an open position in which the grabbing teeth release the article;

whereby the rodless, elevation, and secondary air cylinders can be extended and retracted in a sequence such that the ridge and the grabbing teeth pull the article onto the module.

6. A modular system for automatically transporting articles from one location to another comprising one or more modules located adjacent to each other, wherein each module comprises:

- a frame having opposite longitudinal sides and opposite lateral sides;
- a transport surface supported by the frame between the longitudinal and lateral sides of the frame;
- a pusher/puller supported within the frame for pushing articles from the transport surface to a first location adjacent to the module, and for pulling articles onto the transport surface from a second location adjacent to the module;
- a gate supported within the frame for positioning an article on the transport surface;
- a drive mechanism for causing motion of the transport surface so that articles located on the transport surface move longitudinally along the module from one lateral side to the opposite lateral side;
- a controller for controlling the pusher/puller, gate, and drive mechanism; and
- a communication mechanism for detecting articles located on the module and communicating the existence of an article on the module to the controller of an adjacent module.

7. A modular system for automatically transporting articles from one location to another according to claim 6 wherein the gate comprises:

- at least one elevation air cylinder; and
- a barrier supported on top of the elevation air cylinder;
- whereby when the elevation air cylinder is extended, the barrier is raised above the transport surface to prevent further movement of the article on the transport surface, thereby positioning the article on the transport surface.

8. A modular system for automatically transporting articles from one location to another according to claim 7 wherein the gate has two elevation air cylinders.

9. A modular system for automatically transporting articles from one location to another according to claim 6 wherein the pusher/puller comprises:

- a rodless air cylinder defining a track;
- an assembly comprising at least one elevation air cylinder supported on top of the rodless air cylinder; a bracket mounted on top of the elevation air cylinder, said bracket including a back end extending upward to form a flange, and a front end; and a secondary air cylinder mounted between the back end and the front end of the bracket, said secondary air cylinder housing a rod that extends outward beyond the front end of the bracket from the secondary cylinder when the secondary cylinder is extended; whereby when the elevation air cylinders are extended, the secondary air cylinder housing the rod is raised; and whereby when the rodless air cylinder is extended, the assembly slidably moves within the track;
- a clip at the end of the rod having grabbing teeth and a ridge extending upward from the clip, said clip being operable in a closed position in which the grabbing teeth hold on to the article and an open position in which the grabbing teeth release the article;
- whereby the rodless, elevation, and secondary air cylinders can be extended and retracted in a sequence such that the flange and the rod push the article off of the module, or the ridge and the grabbing teeth pull the article onto the module.

* * * * *